(12) United States Patent
Nakashima et al.

(10) Patent No.: US 12,399,029 B2
(45) Date of Patent: Aug. 26, 2025

(54) INFORMATION PROCESSING APPARATUS, METHOD, AND NON-TRANSITORY COMPUTER READABLE MEDIUM

(71) Applicant: TOYOTA JIDOSHA KABUSHIKI KAISHA, Toyota (JP)

(72) Inventors: Toyokazu Nakashima, Nagoya (JP); Yurika Tanaka, Yokosuka (JP); Shoji Sakamoto, Ichikawa (JP); Yusuke Kobayashi, Ota-ku (JP); Kotaro Okabe, Ichikawa (JP); Hirotada Nakanishi, Toyota (JP); Naoya Oka, Nagakute (JP); Daiki Otani, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 17/714,337

(22) Filed: Apr. 6, 2022

(65) Prior Publication Data
US 2022/0326035 A1    Oct. 13, 2022

(30) Foreign Application Priority Data

Apr. 13, 2021    (JP) .................................. 2021-067926

(51) Int. Cl.
G01C 21/36        (2006.01)
G01C 21/34        (2006.01)

(52) U.S. Cl.
CPC ..... *G01C 21/3679* (2013.01); *G01C 21/3461* (2013.01); *G01C 21/3492* (2013.01); *G01C 21/367* (2013.01)

(58) Field of Classification Search
CPC ............ G01C 21/3679; G01C 21/3461; G01C 21/3492; G01C 21/367; G01C 21/3453; G01C 21/3617; G06Q 30/0259; G06Q 30/0261; G06Q 10/08355; G06Q 30/0631; G06F 16/9537
See application file for complete search history.

(56) References Cited

U.S. PATENT DOCUMENTS

| | | | |
|---|---|---|---|
| 2006/0247852 A1* | 11/2006 | Kortge | G01C 21/3461 340/995.19 |
| 2009/0024318 A1 | 1/2009 | Sakai | |
| 2010/0145609 A1* | 6/2010 | Boss | G06Q 30/018 701/22 |
| 2013/0226731 A1* | 8/2013 | MacNeille | G01C 21/3476 705/26.8 |
| 2015/0286937 A1* | 10/2015 | Hildebrand | H04W 4/50 706/11 |
| 2017/0067750 A1* | 3/2017 | Day | G08G 1/096783 |

FOREIGN PATENT DOCUMENTS

| | | |
|---|---|---|
| JP | 2009-42219 A | 2/2009 |
| JP | 2012-251943 A | 12/2012 |
| JP | 2016-071441 A | 5/2016 |
| JP | 2019-174264 A | 10/2019 |

* cited by examiner

*Primary Examiner* — Joan T Goodbody
*Assistant Examiner* — Godfrey Aleksander Maciorowski
(74) *Attorney, Agent, or Firm* — Oliff PLC

(57) ABSTRACT

A controller of an information processing apparatus is configured to select at least one store as a recommended store from among a plurality of stores located in a vicinity of a stopped vehicle based on a road configuration in the vicinity of the vehicle, and notify the vehicle of information regarding the selected recommended store via a communication interface.

14 Claims, 5 Drawing Sheets

INFORMATION PROCESSING APPARATUS, METHOD, AND NON-TRANSITORY COMPUTER READABLE MEDIUM

CROSS-REFERENCE TO RELATED APPLICATION

This application claims priority to Japanese Patent Application No. 2021-067926, filed on Apr. 13, 2021, the entire contents of which are incorporated herein by reference.

TECHNICAL FIELD

The present disclosure relates to an information processing apparatus, a method, and a program.

BACKGROUND

Technology for efficiently providing products or services is known. For example, Patent Literature (PLT) 1 discloses technology for ordering a product or service from a store with reduction in waiting time at the store.

CITATION LIST

Patent Literature

PTL 1: JP 2016-071441 A

SUMMARY

There is room for improvement with respect to technology for efficiently providing products or services.

It would be helpful to improve technology for efficiently providing products or services.

An information processing apparatus according to an embodiment of the present disclosure includes a controller and a communication interface, the controller configured to:
 select at least one store as a recommended store from among a plurality of stores located in a vicinity of a stopped vehicle, based on a road configuration in the vicinity of the vehicle; and
 notify the vehicle of information regarding the selected recommended store via the communication interface.

A method according to an embodiment of the present disclosure is a method performed by an information processing apparatus, the method including:
 selecting at least one store as a recommended store from among a plurality of stores located in a vicinity of a stopped vehicle, based on a road configuration in the vicinity of the vehicle; and
 notifying the vehicle of information regarding the selected recommended store.

A program according to an embodiment of the present disclosure is configured to cause a computer to execute operations, the operations including:
 selecting at least one store as a recommended store from among a plurality of stores located in a vicinity of a stopped vehicle, based on a road configuration in the vicinity of the vehicle; and
 notifying the vehicle of information regarding the selected recommended store.

According to an embodiment of the present disclosure, technology for efficiently providing products or services is improved.

DETAILED DESCRIPTION

Hereinafter, an embodiment of the present disclosure will be described.

Outline of Embodiment

Figure 1:
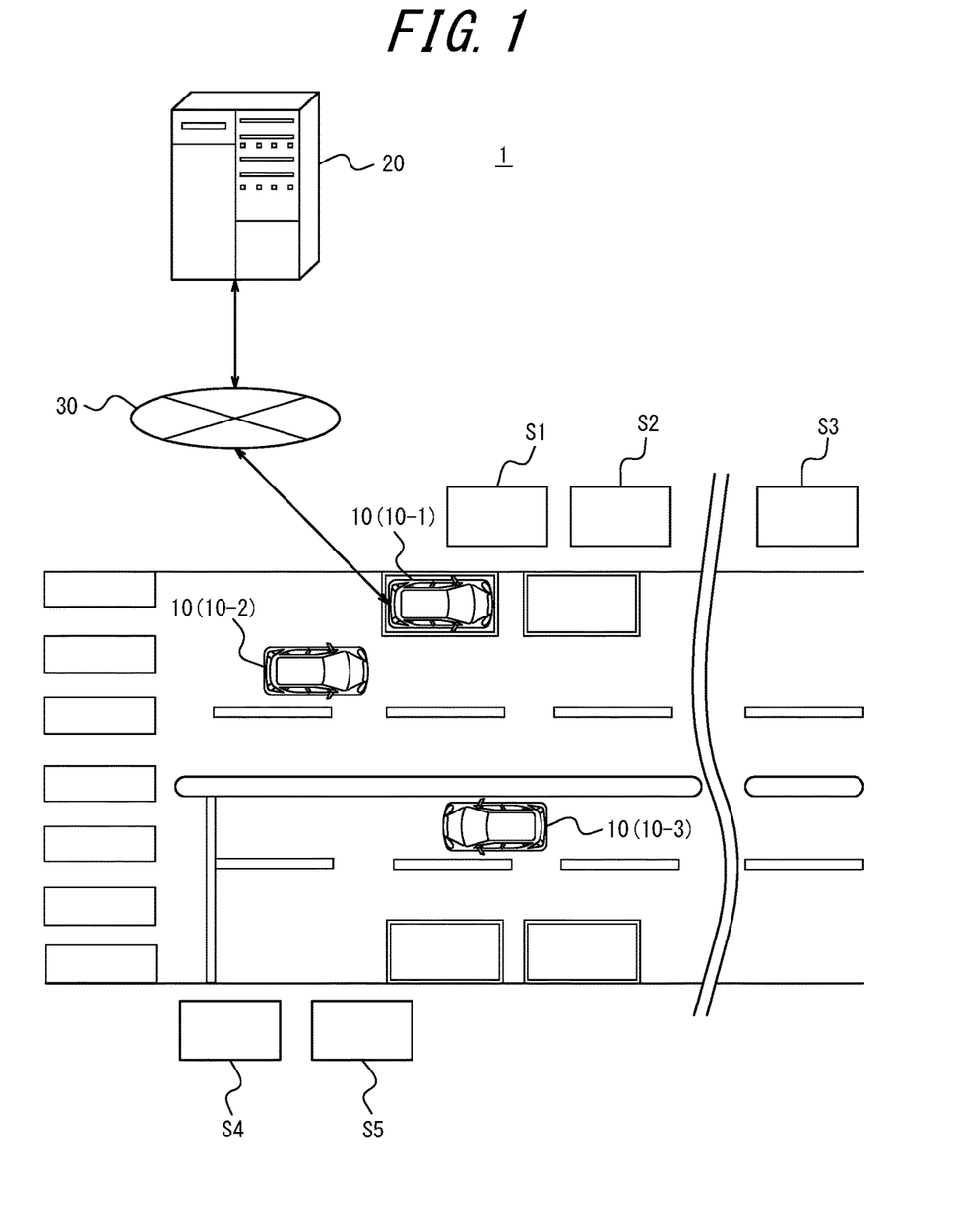
FIG. 1 is a block diagram illustrating a schematic configuration of a system according to an embodiment of the present disclosure.

An outline of a system 1 according to an embodiment of the present disclosure will be described with reference to FIG. 1. A system 1 includes a plurality of vehicles 10 and an information processing apparatus 20. The vehicles 10 and the information processing apparatus 20 are communicably connected to a network 30 including, for example, the Internet, a mobile communication network, and the like.

The plurality of vehicles 10 (in the case of distinguishing each of the plurality of vehicles 10, each of the vehicles 10 is referred to as a vehicle 10-1, a vehicle 10-2, . . . ) are automobiles, for example, but are not limited to these, and may be any vehicles. The automobiles may each be, for example, a gasoline-powered vehicle, a BEV (Battery Electric Vehicle), an HEV (Hybrid Electric Vehicle), a PHEV (Plug-in Hybrid Electric Vehicle), an FCEV (Fuel Cell Electric Vehicle), or the like, but are not limited to these. The vehicles 10 may each be driven by a driver, or the driving may be automated at any level. The automation level is, for example, any one of Level 1 to Level 5 according to the level classification defined by the Society of Automotive Engineers (SAE). The vehicles 10 may be dedicated Mobility as a Service (MaaS) vehicles. The number of the vehicles 10 provided in the system 1 may be freely determined.

The information processing apparatus 20 is, for example, a computer such as a server apparatus. The information processing apparatus 20 can communicate with the vehicles 10 via the network 30.

First, an outline of the present embodiment will be described, and details thereof will be described later. A controller 21 of the information processing apparatus 20 selects at least one store as a recommended store from among a plurality of stores S1, S2, S3, S4, and S5 located in the vicinity of a stopped vehicle 10-1, based on a road configuration in the vicinity of the vehicle 10-1. Then, the controller 21 of the information processing apparatus notifies the vehicle 10-1 of information regarding the selected recommended store via a communication interface 22.

Thus, according to the present embodiment, the recommended store whose, for example, deliverer of a product or provider of a service should arrive at the vehicle 10-1 in a shorter time is selected from among the plurality of stores S1, S2, S3, S4, and S5 located in the vicinity of the stopped vehicle 10-1, based on the road configuration in the vicinity of the vehicle 10-1. Therefore, technology for efficiently providing products or services is improved, in that a lead time is reduced when providing a user in the vehicle 10-1 with the product or service.

Next, configurations of the system 1 will be described in detail.

(Configuration of Vehicle)

Figure 2:
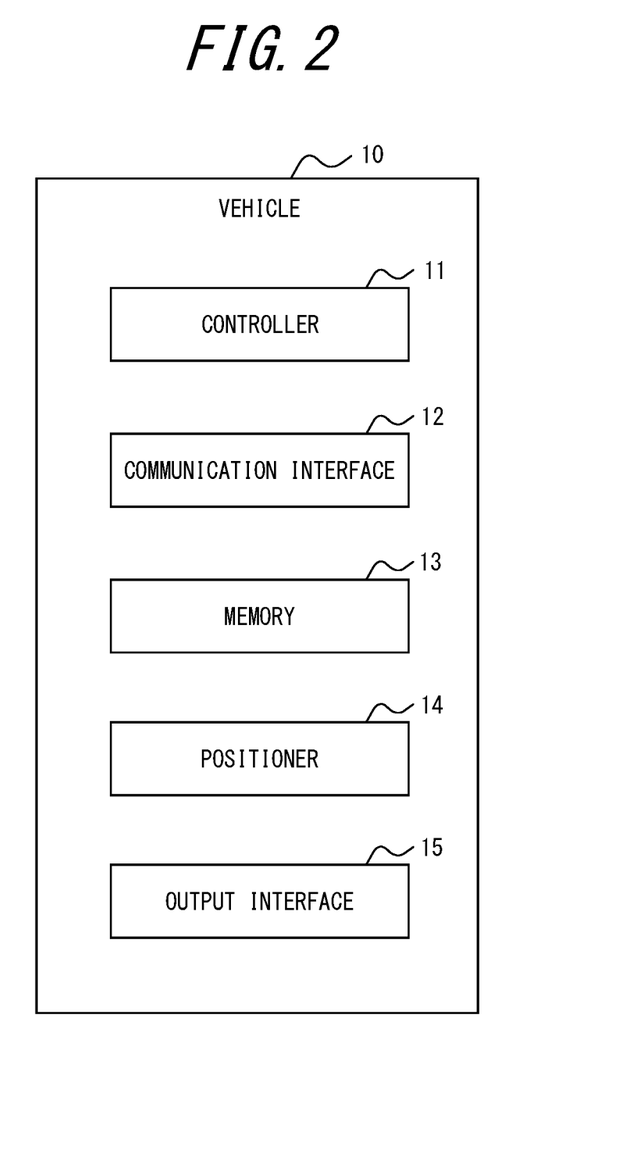
FIG. 2 is a block diagram illustrating a schematic configuration of a vehicle according to the embodiment of the present disclosure.

As illustrated in FIG. 2, the vehicle 10 includes a controller 11, a communication interface 12, a memory 13, a positioner 14, and an output interface 15.

The controller 11 includes at least one processor, at least one programmable circuit, at least one dedicated circuit, or a combination of these. The processor is, for example, a general purpose processor such as a central processing unit (CPU) or a graphics processing unit (GPU), or a dedicated processor that is dedicated to specific processing, but is not limited to these. The programmable circuit is, for example, a field-programmable gate array (FPGA), but is not limited to this. The dedicated circuit is, for example, an application specific integrated circuit (ASIC), but is not limited to this. The controller 11 controls operations of the entire vehicle 10.

The communication interface 12 includes at least one interface for communication for connecting to the network 30. The interface for communication is compliant with, for example, mobile communication standards such as the 4th generation (4G) standard or the 5th generation (5G) standard, but is not limited to these. In the present embodiment, the vehicle 10 communicates with the information processing apparatus 20 via the communication interface 12 and the network 30.

The memory 13 includes one or more memories. The memories are, for example, semiconductor memories, magnetic memories, optical memories, or the like, but are not limited to these. The memories included in the memory 13 may each function as, for example, a main memory, an auxiliary memory, or a cache memory. The memory 13 stores any information used for operations of the vehicle 10. For example, the memory 13 may store a system program, an application program, embedded software, and the like. The information stored in the memory 13 may be updated with, for example, information acquired from the network 30 via the communication interface 12.

The positioner 14 measures the position of the vehicle 10 and generates positional information identifying the position of the vehicle 10 on a map. The positional information may include a speed, travel path, travel distance, or the like, as well as two- or three-dimensional coordinates. The positioner 14 includes a receiver compliant with a satellite positioning system. The receiver is compliant with, for example, the Global Positioning System (GPS), but is not limited to this, and may be compliant with any satellite positioning system. The positioner 14 includes, for example, a gyro sensor and a geomagnetic sensor. A car navigation apparatus, for example, may function as the positioner 14.

The output interface 15 includes an interface for output that outputs, to a user, information generated by the controller 11 or information read from the memory 13. The interface for output may be, for example, a panel display or a head-up display that outputs information in the form of images, a speaker that outputs information in the form of sound, or the like, but is not limited to these, and may be any interface. The output interface 15 outputs information acquired via the communication interface 12 to the user of the vehicle 10 by means of screen display, sound, or the like.

(Configuration of Information Processing Apparatus)

Figure 3:
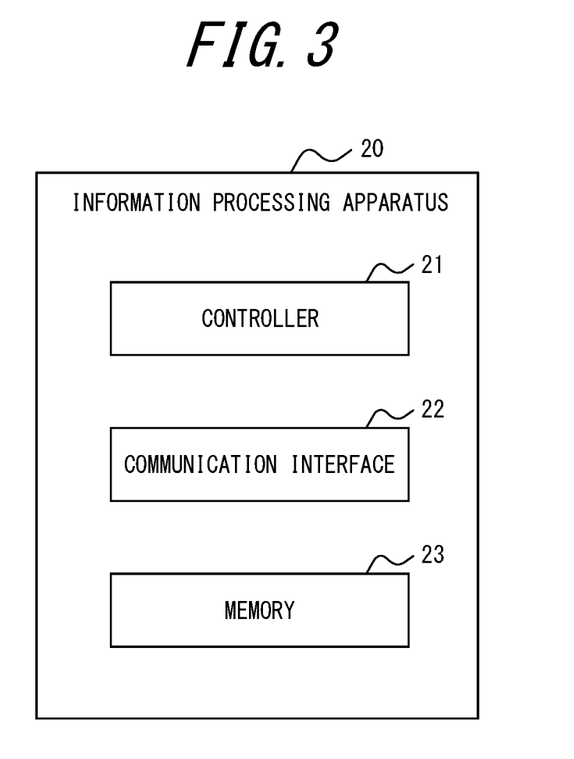
FIG. 3 is a block diagram illustrating a schematic configuration of an information processing apparatus according to the embodiment of the present disclosure.

As illustrated in FIG. 3, the information processing apparatus 20 includes a controller 21, a communication interface 22, and a memory 23.

The controller 21 includes at least one processor, at least one programmable circuit, at least one dedicated circuit, or a combination of these. The controller 21 controls operations of the entire information processing apparatus 20.

The communication interface 22 includes at least one interface for communication for connecting to the network 30. The interface for communication is compliant with, for example, mobile communication standards, wired local area network (LAN) standards, or wireless LAN standards, but is not limited to these, and may be compliant with any communication standards. In the present embodiment, the information processing apparatus 20 communicates with the vehicle 10 via the communication interface 22 and the network 30.

The memory 23 includes one or more memories. The memories included in the memory 23 may each function as, for example, a main memory, an auxiliary memory, or a cache memory. The memory 23 stores any information used for operations of the information processing apparatus 20. For example, the memory 23 may store a system program, an application program, a database, map information, and the like. The information stored in the memory 23 may be updated with, for example, information acquired from the network 30 via the communication interface 22.

(Flow of Operations of Information Processing Apparatus)

Figure 4:
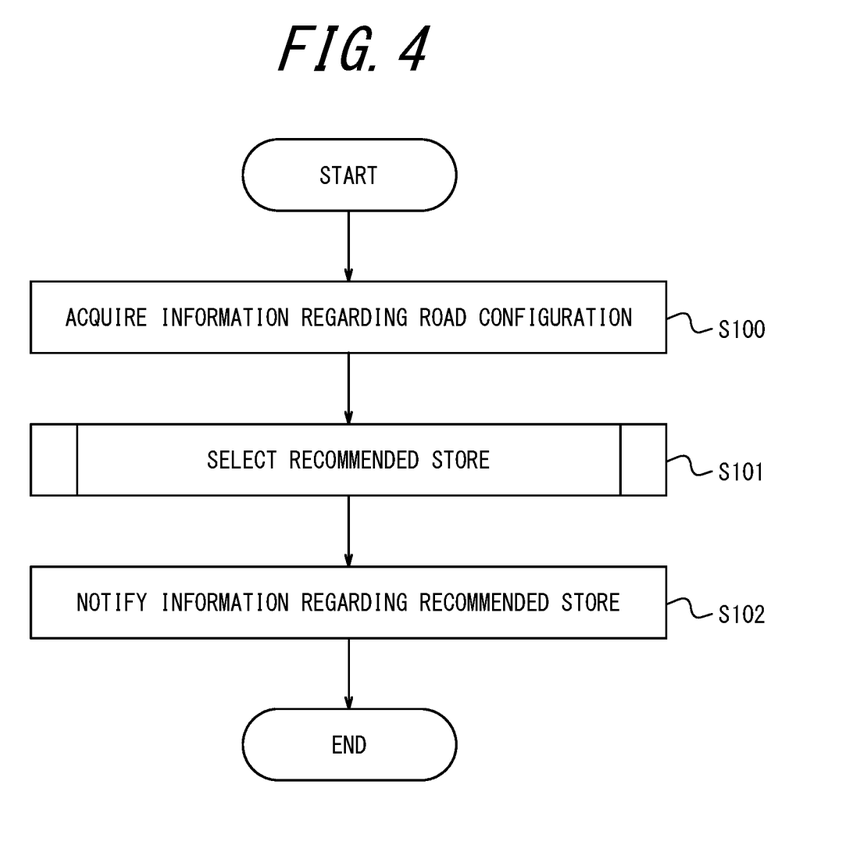
FIG. 4 is a flowchart illustrating operations of the information processing apparatus according to the embodiment of the present disclosure.

Operations of the information processing apparatus 20 according to the present embodiment will be described with reference to FIG. 4. These operations correspond to a method according to the present embodiment.

In this example, suppose that the vehicle 10-1 is stopped in a parking space provided on a road shoulder and that a user who wants to receive a product or service in the vehicle 10-1 is in the vehicle 10-1. The product may include, for example, a meal such as fast food or a beverage such as coffee, but is not limited to these. The service may include, for example, a shoeshine service or the like, but is not limited to this.

Step S100: The controller 21 of the information processing apparatus 20 acquires information regarding a road configuration in the vicinity of the stopped vehicle 10-1.

Specifically, the controller 21 of the information processing apparatus 20 receives, via the communication interface 22, positional information from the stopped vehicle 10-1. Then, the controller 21 of the information processing apparatus 20 acquires information regarding a road configuration in the vicinity of the stopped vehicle 10-1, from the received positional information on the vehicle 10-1 and information on road configurations in a predetermined region stored in advance in the memory 23. The information regarding the road configuration may include the position of a road on a map, the shape of the road, an attribute of the road, information regarding stores located in the vicinity of the road, or the like, but is not limited to these.

Step S101: The controller 21 of the information processing apparatus 20 selects at least one store as a recommended store from among a plurality of stores S1, S2, S3, S4, and S5 located in the vicinity of the stopped vehicle 10-1, based on the information regarding the road configuration acquired in step S100.

Figure 5:
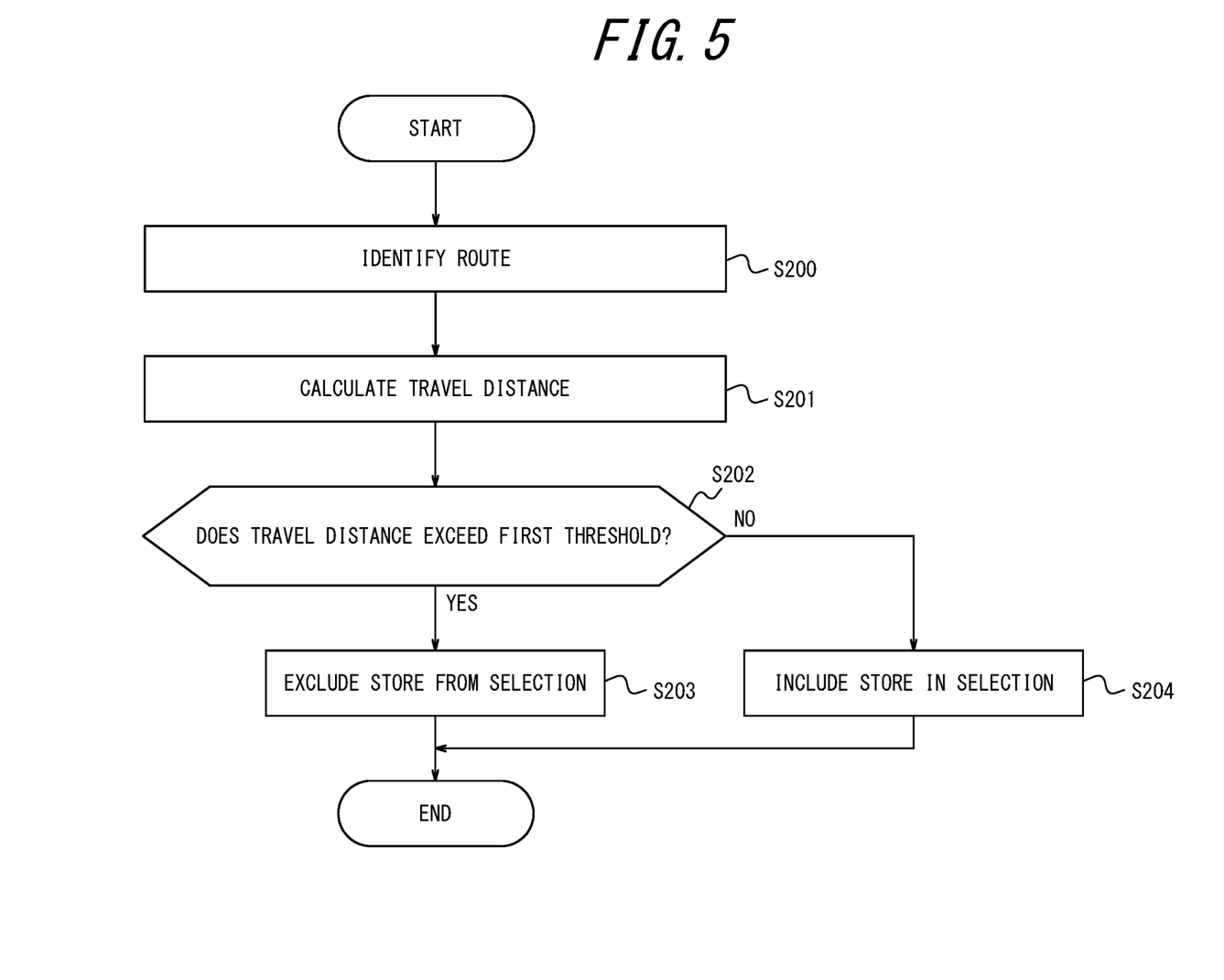
FIG. 5 is a flowchart illustrating an example of processing in step S101.

With further reference to FIG. 5, processing performed in step S101 will be described in detail. In this example, suppose that the stores S1 and S2 are selected as recommended stores in steps S200 to S204 described below.

Step S200: The controller 21 of the information processing apparatus 20 identifies a route from each of the plurality of stores S1, S2, S3, S4, and S5 located in the vicinity of the stopped vehicle 10-1 to the stopped vehicle 10-1, based on the information regarding the road configuration acquired in step S100.

The route may include any information indicating a route for a deliverer of a product or a provider of a service to travel from each of the stores S1, S2, S3, S4, and S5 to the vehicle 10-1 by foot, bicycle, or the like, but is not limited to this.

Step S201: The controller 21 of the information processing apparatus 20 calculates, for each of the stores S1, S2, S3, S4, and S5, a travel distance using the route identified in step S200.

The travel distance may include any information quantitatively representing a distance that the deliverer of the product or the provider of the service travels from each of the stores S1, S2, S3, S4, and S5 to the vehicle 10-1 by foot, bicycle, or the like, but is not limited to this.

Step S202: The controller 21 of the information processing apparatus 20 determines, for each of the stores S1, S2, S3, S4, and S5, whether the travel distance calculated in step S201 exceeds a predetermined first threshold. In a case in which the controller 21 determines that the travel distance exceeds the predetermined first threshold (step S202—Yes), the process proceeds to step S203. On the other hand, in a case in which the controller 21 determines that the travel distance does not exceed the predetermined first threshold (step S202—No), the process proceeds to step S204.

The predetermined first threshold may be set as appropriate, taking into account a means for transportation of the deliverer of the product or the provider of the service, an allowable time between receipt of an order and provision of the product or service, or the like, but is not limited to this.

Step S203: The controller 21 of the information processing apparatus 20 excludes the stores S3, S4, and S5 whose travel distances exceed the predetermined first threshold, from selection as recommended stores. Then, the process proceeds to step S102.

Step S204: The controller 21 of the information processing apparatus 20 includes the stores S1 and S2 whose travel distances do not exceed the predetermined first threshold, in selection as recommended stores. Then, the process proceeds to step S102.

In this way, the controller 21 of the information processing apparatus 20 selects, as the recommended stores, one or more stores S1 and S2 whose travel distances do not exceed the predetermined first threshold, from among the plurality of stores S1, S2, S3, S4, and S5 located in the vicinity of the stopped vehicle 10-1.

Step S102: The controller 21 of the information processing apparatus 20 notifies, via the communication interface 22, the stopped vehicle 10-1 of information regarding the recommended stores selected in step S101.

Specifically, the controller 21 of the information processing apparatus 20 transmits, via the communication interface 22, information regarding the recommended stores selected in step S101 to the stopped vehicle 10-1. Then, the controller 11 of the vehicle 10-1 receives, via the communication interface 12, the information regarding the recommended stores transmitted from the information processing apparatus 20. Then, the controller 11 of the vehicle 10-1 outputs, via the output interface 15, the received information regarding the recommended stores to the user in the vehicle 10-1 by screen display, sound, or the like. That is, information regarding the stores S3, S4, and S5, which are excluded in step S203, among the plurality of stores S1, S2, S3, S4, and S5 located in the vicinity of the vehicle 10-1, is not presented to the user in the vehicle 10-1. As a result, the user in the vehicle 10-1 can order a product or service from a desired store among the recommended stores (stores S1 and S2 in this example) via a user terminal or the like. Thus, the store selected by the user can let a deliverer of the product or a provider of the service arrive at the vehicle 10-1 in a shorter time. The information regarding each recommended store may include the name of the recommended store, the contents of products or services provided by the recommended store, a time required for a deliverer of the products or a provider of the services to arrive at the vehicle 10-1, a location of the recommended store on a map, reputations of the recommended store such as word of mouth, or the like, but is not limited to these.

As described above, the controller 21 of the information processing apparatus 20 according to the present embodiment selects at least one store as a recommended store from among the plurality of stores S1, S2, S3, S4, and S5 located in the vicinity of the stopped vehicle 10-1, based on a road configuration in the vicinity of the vehicle 10-1. Then, the controller 21 of the information processing apparatus 20 notifies the vehicle 10-1 of information regarding the selected recommended store, via the communication interface 22.

According to such a configuration, the recommended store whose, for example, deliverer of products or provider of services should arrive at the vehicle 10-1 in a shorter time is selected from among the plurality of stores S1, S2, S3, S4, and S5 located in the vicinity of the vehicle 10-1, based on the road configuration in the vicinity of the vehicle 10-1. Therefore, technology for efficiently providing products or services is improved, in that a lead time is reduced when providing the user in the vehicle 10-1 with a product or service.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

As a variation, the configuration and operations of the information processing apparatus 20 may be distributed to a plurality of computers capable of communicating with each other. For example, an embodiment in which some or all of the components of the information processing apparatus 20 are provided in the vehicle 10 can also be implemented. For example, a navigation apparatus mounted on the vehicle 10 may be provided with some or all components of the information processing apparatus 20.

As a variation, the controller 21 of the information processing apparatus 20 may exclude, from selection, a store the route from which, among the plurality of stores S1, S2, S3, S4, and S5 located in the vicinity of the stopped vehicle 10-1, to the stopped vehicle 10-1 has a travel time exceeding a predetermined first threshold. Specifically, as in the same manner as in step S200 described above, the controller 21 of the information processing apparatus 20 identifies a route from each of the plurality of stores S1, S2, S3, S4, and S5 located in the vicinity of the stopped vehicle 10-1 to the stopped vehicle 10-1. Then, the controller 21 of the information processing apparatus 20 calculates, for each of the stores S1, S2, S3, S4, and S5, a travel time using the identified route. For example, the controller 21 of the information processing apparatus 20 can calculate the travel time by dividing a travel distance calculated in the same manner as in step S201 by an average speed by foot, bicycle, or the like. Then, the controller 21 of the information processing apparatus 20 excludes, from selection, a store the calculated travel time from which exceeds the predetermined first threshold. Subsequent processing is the same as in the embodiment described above. Therefore, time required for a deliverer of products or a provider of services to arrive at the vehicle 10-1 is reduced, and thus improving technology for efficiently providing products or services.

As another variation, the controller 21 of the information processing apparatus 20 may exclude, from selection, a store the route from which, among the plurality of stores S1, S2, S3, S4, and S5 located in the vicinity of the stopped vehicle 10-1, to the stopped vehicle 10-1 has a height difference exceeding a predetermined second threshold. Specifically, the memory 23 of the information processing apparatus 20 stores in advance any information quantitatively representing elevations or the like of roads in a predetermined region, or the like. Then, the controller 21 of the information processing apparatus 20 identifies a route from each of the plurality of stores S1, S2, S3, S4, and S5 located in the vicinity of the stopped vehicle 10-1 to the stopped vehicle 10-1, in the same manner as in step S200 described above. Then, the controller 21 of the information processing apparatus 20 calculates, for each of the stores S1, S2, S3, S4, and S5, a height difference in the identified route with reference to the memory 23. Then, the controller 21 of the information processing apparatus 20 excludes, from selection, a store whose calculated height difference exceeds the predetermined second threshold. Subsequent processing is the same as in the embodiment described above. This allows a deliverer of products or a provider of services to use a route with less height difference. Therefore, time required for a deliverer of products or a provider of services to arrive at the vehicle 10-1 is reduced, and thus improving technology for efficiently providing products or services. The height difference may be the elevation difference between a start point and an end point of the identified route, or a maximum elevation difference in the identified route, but is not limited to these. The height difference may be an indicator representing the presence or absence of stairs such as a pedestrian bridge, or the presence or absence of steps such as a sidewalk. The predetermined second threshold may be set as appropriate, taking into account a means for transportation of a deliverer of products or a provider of services, an allowable time between receipt of an order and provision of a product or service, or the like, but is not limited to this.

As another variation, the controller 21 of the information processing apparatus 20 may exclude, from selection, a store the route from which, among the plurality of stores S1, S2, S3, S4, and S5 located in the vicinity of the stopped vehicle 10-1, to the stopped vehicle 10-1 has an accident occurrence rate exceeding a predetermined third threshold. Specifically, the memory 23 of the information processing apparatus 20 stores in advance accident occurrence rates in a predetermined region. Then, the controller 21 of the information processing apparatus 20 identifies a route from each of the plurality of stores S1, S2, S3, S4, and S5 located in the vicinity of the stopped vehicle 10-1 to the stopped vehicle 10-1, in the same manner as in step S200 described above. Then, the controller 21 of the information processing apparatus 20 acquires, for each of the stores S1, S2, S3, S4, and S5, an accident occurrence rate in the identified route with reference to the memory 23. Then, the controller 21 of the information processing apparatus 20 excludes, from selection, a store whose acquired accident occurrence rate exceeds a predetermined third threshold. Subsequent processing is the same as in the embodiment described above. This reduces the likelihood that a deliverer of products or a provider of services will encounter an accident, while traveling between the store and the vehicle 10-1, and thus improving technology for efficiently providing products or services. The predetermined third threshold may be set as appropriate, taking into account an average historical accident occurrence rate in the region where the vehicle 10-1 is stopped, but is not limited to this.

As another variation, the controller 21 of the information processing apparatus 20 may exclude, from selection, a store the route from which, among the plurality of stores S1, S2, S3, S4, and S5 located in the vicinity of the stopped vehicle 10-1, to the stopped vehicle 10-1 has the degree of congestion exceeding a predetermined fourth threshold. Specifically, the memory 23 of the information processing apparatus 20 stores in advance the degree of congestion in a predetermined region. Then, the controller 21 of the information processing apparatus 20 identifies a route from each of the plurality of stores S1, S2, S3, S4, and S5 located in the vicinity of the stopped vehicle 10-1 to the stopped vehicle 10-1, in the same manner as in step S200 described above. Then, the controller 21 of the information processing apparatus 20 acquires, for each of the stores S1, S2, S3, S4, and S5, the degree of congestion in the identified route with reference to the memory 23. Then, the controller 21 of the information processing apparatus 20 excludes, from selection, a store whose acquired degree of congestion exceeds the predetermined fourth threshold. Subsequent processing is the same as in the embodiment described above. This avoids that a deliverer of products or a provider of services is involved in congestion. Therefore, time required for a deliverer of products or a provider of services to arrive at the vehicle 10-1 is reduced, and thus improving technology for efficiently providing products or services. The degree of congestion may include a stepwise indicator such as "high, standard, and low" that represents historical average foot traffic in the region where the vehicle 10-1 is stopped, but is not limited to this. The predetermined fourth threshold may be set as appropriate, taking into account the average historical foot traffic in the region where the vehicle 10-1 is stopped, but is not limited to this.

As another variation, in a case in which the road configuration in the vicinity of the stopped vehicle 10-1 includes a median strip, a pedestrian crossing, a pedestrian bridge, or a street railway, the controller 21 of the information processing apparatus 20 may exclude, from selection, a store that is located within a predetermined range from the median strip, the pedestrian crossing, the pedestrian bridge, or the street railway, from among the plurality of stores located in the vicinity of the stopped vehicle 10-1. Specifically, the memory 23 of the information processing apparatus 20 stores in advance information regarding road configurations, including the presence or absence of a median strip, the presence or absence of a pedestrian crossing, the presence or absence of a pedestrian bridge, or the presence or absence of a street railway in a predetermined region. Then, the controller 21 of the information processing apparatus 20 excludes, from selection, a store located within a predetermined range from a median strip, a pedestrian crossing, a pedestrian bridge, or a street railway, from among the plurality of stores S1, S2, S3, S4, and S5 located in the vicinity of the stopped vehicle 10-1, with reference to the memory 23. Subsequent processing is the same as in the embodiment described above. The predetermined range may include a range to a store located on an opposite lane side to the stopped vehicle 10-1 across a median strip, a pedestrian crossing, a pedestrian bridge, or a street railway, or the like, but is not limited to this. Accordingly, a deliverer of products or a provider of services need not cross a roadway or street railway, while traveling from the store to the vehicle 10-1. This reduces time required for the deliverer of products or the provider of services to arrive at the vehicle 10-1, and also reduces the likelihood that the deliverer of products or the provider of services will encounter an accident while traveling between the store and the vehicle 10-1. Thus, technology for efficiently providing products or services is improved.

As a variation, an embodiment in which a general purpose computer functions as the information processing apparatus 20 according to the above embodiment can also be implemented. Specifically, a program in which processes for realizing the functions of the information processing apparatus 20 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. An information processing apparatus comprising a controller and a communication interface, the controller configured to:
   identify a route from each of a plurality of stores located in a vicinity of a stopped vehicle to the stopped vehicle based on a road configuration in the vicinity of the stopped vehicle, wherein the identified route is a route on which a deliverer of a product or a provider of a service travels from each of the stores to the stopped vehicle by foot,
   select at least one store as a recommended store from among the plurality of stores based on the identified route; and
   notify the stopped vehicle of information regarding the selected recommended store via the communication interface,
   wherein in a case in which the road configuration includes a median strip, a pedestrian crossing, or a pedestrian bridge, the controller, when selecting the recommended store, excludes, from selection, a store located within a predetermined range from the median strip, the pedestrian crossing, or the pedestrian bridge.

2. The information processing apparatus according to claim 1, wherein the controller is further configured to:
   calculate, for each of the stores, a travel distance or a travel time required by the deliverer of the product or the provider of the service to travel by foot on the identified route from each of the stores to the stopped vehicle; and
   when selecting the recommended store, exclude, from selection, a store the travel distance or the travel time for which exceeds a predetermined threshold.

3. The information processing apparatus according to claim 1, wherein when selecting the recommended store, the controller excludes, from selection, a store the route from which has a height difference exceeding a predetermined threshold.

4. The information processing apparatus according to claim 1, wherein when selecting the recommended store, the controller excludes, from selection, a store the route from which has an accident occurrence rate exceeding a predetermined threshold.

5. The information processing apparatus according to claim 1, wherein when selecting the recommended store, the controller excludes, from selection, a store the route from which has a degree of congestion exceeding a predetermined threshold.

6. A method performed by an information processing apparatus, the method comprising:
   identifying a route from each of a plurality of stores located in a vicinity of a stopped vehicle to the stopped vehicle based on a road configuration in the vicinity of the stopped vehicle, wherein the identified route is a route on which a deliverer of a product or a provider of a service travels from each of the stores to the stopped vehicle by foot,
   selecting at least one store as a recommended store from among the plurality of stores based on the identified route;
   notifying the stopped vehicle of information regarding the selected recommended store; and
   in a case in which the road configuration includes a median strip, a pedestrian crossing, or a pedestrian bridge, when selecting the recommended store, excluding from selection a store located within a predetermined range from the median strip, the pedestrian crossing, or the pedestrian bridge.

7. The method according to claim 6, further comprising:
   calculating, for each of the stores, a travel distance or a travel time required by the deliverer of the product or the provider of the service to travel by foot on the identified route from each of the stores to the stopped vehicle; and
   when selecting the recommended store, excluding, from selection, a store the travel distance or the travel time for which exceeds a predetermined threshold.

8. The method according to claim 6, further comprising, when selecting the recommended store, excluding, from selection, a store the route from which has a height difference exceeding a predetermined threshold.

9. The method according to claim 6, further comprising, when selecting the recommended store, excluding, from selection, a store the route from which has an accident occurrence rate exceeding a predetermined threshold.

10. The method according to claim 6, further comprising, when selecting the recommended store, excluding, from selection, a store the route from which has a degree of congestion exceeding a predetermined threshold.

11. A non-transitory computer readable medium storing a program configured to cause a computer to execute operations, the operations comprising:
    identifying a route from each of a plurality of stores located in a vicinity of a stopped vehicle to the stopped vehicle based on a road configuration in the vicinity of the stopped vehicle, wherein the identified route is a route on which a deliverer of a product or a provider of a service travels from each of the stores to the stopped vehicle by foot,
    selecting at least one store as a recommended store from among the plurality of stores based on the identified route;
    notifying the stopped vehicle of information regarding the selected recommended store; and
    in a case in which the road configuration includes a median strip, a pedestrian crossing, or a pedestrian bridge, when selecting the recommended store, excluding from selection a store located within a predetermined range from the median strip, the pedestrian crossing, or the pedestrian bridge.

12. The non-transitory computer readable medium according to claim 11, wherein the operations further comprises:
    calculating, for each of the stores, a travel distance or a travel time required by the deliverer of the product or the provider of the service to travel by foot on the identified route from each of the stores to the stopped vehicle; and
    when selecting the recommended store, excluding, from selection, a store the travel distance or the travel time for which exceeds a predetermined threshold.

13. The non-transitory computer readable medium according to claim 11, wherein the operations further comprise, when selecting the recommended store, excluding, from selection, a store the route from which has a height difference exceeding a predetermined threshold.

14. The non-transitory computer readable medium according to claim 11, wherein the operations further comprise, when selecting the recommended store, excluding, from selection, a store the route from which has an accident occurrence rate exceeding a predetermined threshold.

* * * * *